US012633111B2

(12) United States Patent
Qasemi et al.

(10) Patent No.: US 12,633,111 B2
(45) Date of Patent: May 19, 2026

(54) HUMAN-ASSISTED NEURO-SYMBOLIC OBJECT AND EVENT MONITORING

(71) Applicant: Robert Bosch GmbH, Stuttgart (DE)

(72) Inventors: Ehsan Qasemi, Los Angeles, CA (US); Alessandro Oltramari, Pittsburgh, PA (US)

(73) Assignee: Robert Bosch GmbH (DE)

( * ) Notice: Subject to any disclaimer, the term of this patent is extended or adjusted under 35 U.S.C. 154(b) by 653 days.

(21) Appl. No.: 17/871,335

(22) Filed: Jul. 22, 2022

(65) Prior Publication Data

US 2024/0029422 A1 Jan. 25, 2024

(51) Int. Cl.
| | |
|---|---|
| *G06V 10/94* | (2022.01) |
| *G06F 40/20* | (2020.01) |
| *G06V 10/764* | (2022.01) |
| *G06V 10/86* | (2022.01) |
| *G06V 20/40* | (2022.01) |

(Continued)

(52) U.S. Cl.
CPC ............ *G06V 10/945* (2022.01); *G06F 40/20* (2020.01); *G06V 10/764* (2022.01); *G06V 10/86* (2022.01); *G06V 20/41* (2022.01); *G06V 20/52* (2022.01); *H04N 7/183* (2013.01); *G06V 2201/07* (2022.01); *G08G 1/0125* (2013.01)

(58) Field of Classification Search
CPC .... G06V 10/945; G06V 10/764; G06V 10/86; G06V 20/41; G06V 20/52; G06V 2201/07; G06V 10/82; G06V 20/54; G06F 40/20; H04N 7/183; G08G 1/0125
See application file for complete search history.

(56) References Cited

U.S. PATENT DOCUMENTS

| | | |
|---|---|---|
| 11,037,024 B1 | 6/2021 | Ratti et al. |
| 11,068,713 B1 | 7/2021 | Li et al. |

(Continued)

FOREIGN PATENT DOCUMENTS

| | | |
|---|---|---|
| CN | 111566654 B | 10/2023 |

OTHER PUBLICATIONS

Scarselli et al., "The Graph Neural Network Model", IEEE Transactions on Neural Networks, vol. 20, No. 1, Jan. 2009, 20 pages.

(Continued)

*Primary Examiner* — Solomon G Bezuayehu
(74) *Attorney, Agent, or Firm* — Dickinson Wright PLLC

(57) ABSTRACT

A human-assisted neuro-symbolic system for outputting fine-grained classifications and corresponding images or video of a desired object or scene. The system includes one or more cameras configured to generate a video feed of a scene. One or more processors are programmed to generate video analytics data from the video feed, including coarse-grained classification data regarding one or more objects in the scene. A knowledge graph is built with instantiated (e.g., time-based) domain ontology of the one or more objects in the scene. The domain ontology can be augmented via human-in-the-loop. Once augmented, the knowledge graph can be infused into a deep learning model, such as a natural language model. An input (e.g., in natural language) can seek fine-grained input characteristics, and the deep learning model infused with the knowledge graph retrieves a corresponding portion of the video feed with the fine-grained input characteristics.

10 Claims, 5 Drawing Sheets

(51) Int. Cl.
| | |
|---|---|
| *G06V 20/52* | (2022.01) |
| *H04N 7/18* | (2006.01) |
| *G08G 1/01* | (2006.01) |

(56) References Cited

U.S. PATENT DOCUMENTS

| | | | | |
|---|---|---|---|---|
| 11,599,714 | B2 * | 3/2023 | Munro | G06F 40/42 |
| 2012/0284259 | A1 | 11/2012 | Jehuda | |
| 2014/0211044 | A1 | 7/2014 | Lee et al. | |
| 2016/0179945 | A1 | 6/2016 | Lastra Diaz et al. | |
| 2018/0190111 | A1 * | 7/2018 | Green | G08G 1/052 |
| 2018/0210913 | A1 | 7/2018 | Beller et al. | |
| 2018/0373980 | A1 | 12/2018 | Huval | |
| 2019/0228262 | A1 | 7/2019 | Gonzalez et al. | |
| 2019/0354544 | A1 | 11/2019 | Hertz et al. | |
| 2020/0097602 | A1 * | 3/2020 | Ristoski | G06N 5/022 |
| 2020/0166897 | A1 * | 5/2020 | Campos | G06V 20/588 |
| 2020/0167653 | A1 * | 5/2020 | Manjunath | G06N 3/082 |
| 2020/0167689 | A1 | 5/2020 | Pojman et al. | |
| 2021/0287103 | A1 * | 9/2021 | Bangalore | G06F 40/30 |
| 2022/0012518 | A1 | 1/2022 | Sutherland | |
| 2022/0067405 | A1 * | 3/2022 | Kim | G06V 10/82 |
| 2022/0067406 | A1 | 3/2022 | Hotson et al. | |
| 2022/0138185 | A1 | 5/2022 | Tran et al. | |
| 2022/0230625 | A1 * | 7/2022 | Zhu | G06F 18/2155 |
| 2022/0269863 | A1 * | 8/2022 | Araki | G06F 40/169 |
| 2022/0343903 | A1 * | 10/2022 | Mostafazadeh | G06F 3/0481 |
| 2023/0117932 | A1 * | 4/2023 | Geiger | G06V 10/764 |
| | | | | 706/12 |
| 2023/0162515 | A1 * | 5/2023 | Kozlowski | G16B 20/00 |
| | | | | 382/133 |
| 2023/0252700 | A1 * | 8/2023 | Barlew | G06T 11/206 |
| 2023/0325427 | A1 * | 10/2023 | Budhraja | G06N 20/00 |
| 2024/0073159 | A1 | 2/2024 | Bhatia et al. | |
| 2024/0112044 | A1 * | 4/2024 | Kim | G06N 5/022 |
| 2024/0355130 | A1 * | 10/2024 | Sunderland | G06V 20/54 |

OTHER PUBLICATIONS

Gamanayake et al., "Cluster Pruning: An Efficient Filter Pruning Method for Edge AI Vision Applications", arXiv:2003.02449v1 [cs.CV] Mar. 5, 2020, 17 pages.
Haller et al., "The Modular SSN Ontology: A Joint W3C and OGC Standard Specifying the Semantics of Sensors, Observations, Sampling, and Actuation", Semantic Web X (2018) 1-0X, 24 pages.
Ma et al., "Towards Generalizable Neuro-Symbolic Systems for Commonsense Question Answering", Proceedings of the First Workshop on Commonsense Inference in Natural Language Processing, pp. 22-32 Hongkong, China, Nov. 3, 2019, 11 pages.
Weinberger et al., "Feature Hashing for Large Scale Multitask Learning", Proceedings of the 26 th International Conference on Machine Learning, Montreal, Canada, 2009, 8 pages.
Sap et al., "ATOMIC: An Atlas of Machine Commonsense for If-Then Reasoning", The Thirty-Third AAAI Conference on Artificial Intelligence (AAAI-19), 9 pages.
Lin et al., "KagNet: Knowledge-Aware Graph Networks for Commonsense Reasoning", Proceedings of the 2019 Conference on Empirical Methods in Natural Language Processing and the 9th International Joint Conference on Natural Language Processing, pp. 2829-2839, Hong Kong, China, Nov. 3-7, 2019, 11 pages.
Liu et al., "ROBERTa: A Robustly Optimized BERT Pretraining Approach", arXiv:1907.11692v1 [cs.CL] Jul. 26, 2019, 13 pages.
Oltramari et al., "Neuro-symbolic Architectures for Context Understanding", arXiv:2003.04707v1 [cs.AI] Mar. 9, 2020, 18 pages.
Walton et al., "LiveLayer—Live Traffic Projection onto Maps", Eurographics 2011/ R. Laramee and I. S. Lim, 2 pages.
Website for https://www.cnn.com/2021/07/28/politics/infrastructure-bill-explained/index.html, retrieved on Jul. 13, 2022, 5 pages.
Chowdhury et al., "Towards Leveraging Commonsense Knowledge for Autonomous Driving", 2021, 5 pages.
Ilievski et al., "Consolidating Commonsense Knowledge", arXiv:2006. 06114v2 [cs.AI] Jun. 22, 2020, 14 pages.
Gori et al., "A New Model for Learning in Graph Domains", Proceedings. 2005 IEEE international joint conference on neural networks, vol. 2, pp. 729-734, 2005, 6 pages.
Chan-Tong Lam et al., "A Real-Time Traffic Congestion Detection System Using On-Line Images," 2017 17th IEEE International Conference on Communication Technology, pp. 1548-1552.
RoopTeja Muppalla et al., "A Knowledge Graph Framework for Detecting Traffific Events Using Stationary Cameras," Dated Jun. 25, 2017, 7 Pages.
Chelsea Lancelle, "Distributed Acoustic Sensing for Imaging Near-Surface Geology and Monitoring Traffic at Garner Valley, California," 2016, 109 Pages.
Gorur D, Rasmussen CE. "Dirichlet process Gaussian mixture models: Choice of the base distribution". Journal of Computer Science and Technology 25(4): 615626 Jul. 2010 (Year: 2010).
Mandal et al., "Object Detection and Tracking Algorithms for Vehicle Counting: A Comparative Analysis", Journal of Big Data Analytics in Transportation (Year: 2020).
Santhosh et al., "Trajectory-Based Scene Understanding Using Dirichlet Process Mixture Model", IEEE Transactions on Cybernetics, vol. 51, No. 8, pp. 4148-4161 (Year: 2021).
Bakaev, Maxim, Sebastian Heil, and Martin Gaedke. "Distributional Ground Truth: Non-Redundant Crowdsourcing Data Quality Control in UI Labeling Tasks." arXiv preprint arXiv:2012.13546 (2020). (Year: 2020).
S. Ulbrich, T. Menzel, A. Reschka, F. Schuldt and M. Maurer, "Defining and Substantiating the Terms Scene, Situation, and W Scenario for Automated Driving," 2015 IEEE 18th International Conference on Intelligent Transportation Systems, Gran Canaria, Spain, 2015, pp. 982-988 (Year: 2015).
Halilaj, Lavdim, et al. "A knowledge graph-based approach for situation comprehension in driving scenarios." European Semantic Web Conference. Cham: Springer International Publishing, pp. 699-716; 2021 (Year: 2021), 18 Pages.
Mandal, Vishal, et al. "Artificial intelligence-enabled traffic monitoring system." Sustainability 12.21 (2020): 9177. (Year: 2020), 21 Pages.
Qasemi, Ehsan, and Alessandro Oltramari. "Intelligent traffic monitoring with hybrid ai." arXiv preprint arXiv:2209.00448 (2022). (Year: 2022), 5 Pages.
Ghahremannezhad, Hadi, Hang Shi, and Chengjun Liu. "Real-time accident detection in traffic surveillance using deep learning."2022 IEEE international conference on imaging systems and techniques (1ST). IEEE, 2022. (Year: 2022), 6 Pages.

\* cited by examiner

300

Rules

- ☐ # of vehicles — greater than — 6
- ☑ vehicle velocity — greater than — 3 meters/s
- ☐ duration is — greater than — 20 seconds
- ☐ spatial relationship is — in the same — lane
- ☐ weather is — clear
- ☑ What type of scene are you interested in?

There are 3 objects in the scene, 3 cars. The second car is moving at average speed of 8 m/s + Add new rule (not yet implemented)

Search Results

2 results found

File name    chesapeake/00-07-5F-B9-01-D4/AOPXmid 00-07-5F-B9-01-04_210306153000-210306153500.video.h234

Time    Sat Mar 06 2021 15:33:11 GMT 0600 (EST)

Description    There are 3 objects(s) in the scene. From the object(s), all 3 are car, the second car is moving with the average speed of 8.2092375704468503 m/s. the third car is moving with the average speed of 2.990332304883734 m/s. in lane 3 we see second car, and third car.

Cosine Similarity    0.7213273839537075

Search

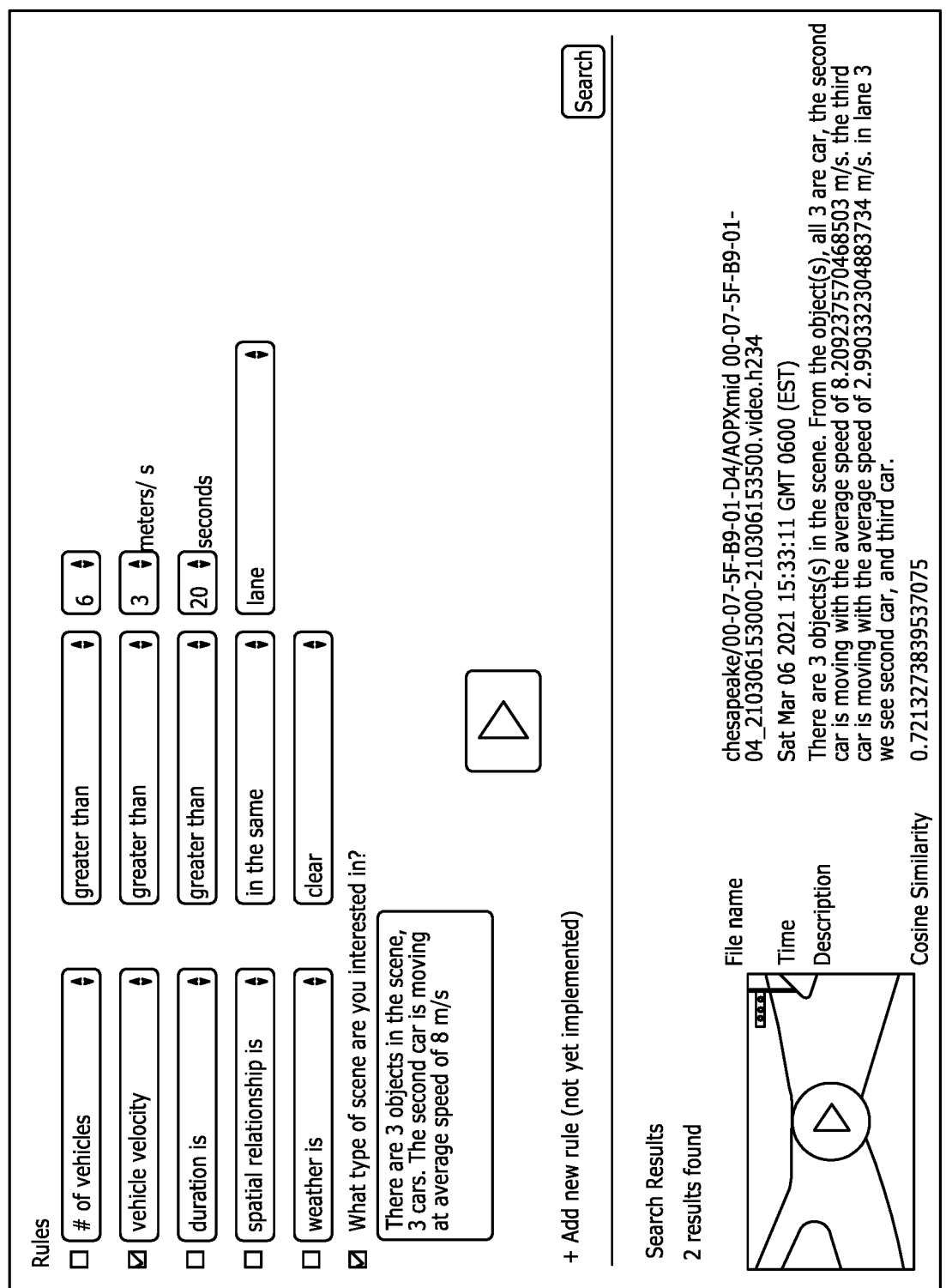

FIG. 3

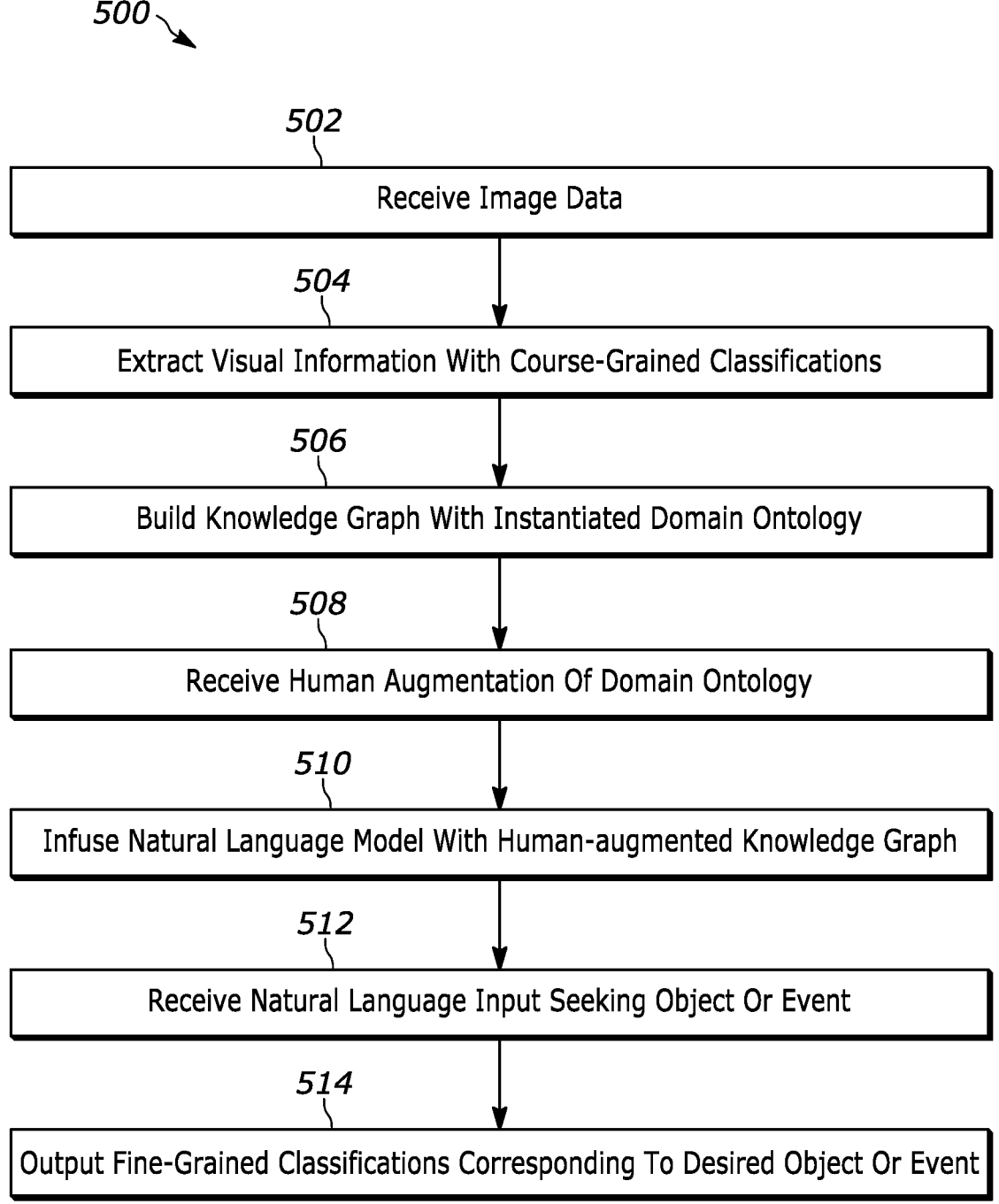

500

502

Receive Image Data

504

Extract Visual Information With Course-Grained Classifications

506

Build Knowledge Graph With Instantiated Domain Ontology

508

Receive Human Augmentation Of Domain Ontology

510

Infuse Natural Language Model With Human-augmented Knowledge Graph

512

Receive Natural Language Input Seeking Object Or Event

514

Output Fine-Grained Classifications Corresponding To Desired Object Or Event

FIG. 5

HUMAN-ASSISTED NEURO-SYMBOLIC OBJECT AND EVENT MONITORING

TECHNICAL FIELD

The present disclosure relates to methods and systems for human-assisted neuro-symbolic object and event monitoring. In particular, this disclosure introduces a human-assisted neuro-symbolic (HANS) architecture that enables context understanding by reasoning over multi-modal sensor-based knowledge.

BACKGROUND

Intelligent traffic management systems, also referred to as intelligent traffic monitoring (ITMo), may be used to improve safety, traffic flow, and overall system efficiency. These systems are typically implemented to reduce congestion, react to incidents that impact traffic flow, and provide insight into traffic patterns. The abundance of real-time data points can be used to make traffic mitigation strategies more efficient and effective. ITMo systems are also an important instrument to improve road safety and security; they can focus on deriving actionable knowledge from networks of sensors deployed along highways, city roads and intersections.

SUMMARY

According to an embodiment, a method of outputting fine-grained classifications corresponding to an object utilizing a human-assisted neuro-symbolic system is provided. The method includes receiving image data from one or more image sensors; extracting visual information from the image data, wherein the visual information includes a coarse-grained classification of one or more objects or events detected in the image data; building a knowledge graph with instantiated domain ontology of the one or more objects or events; augmenting the domain ontology of the knowledge graph with a human-in-the-loop process to yield a human-augmented knowledge graph; infusing a natural language model with the human-augmented knowledge graph; receiving a natural language input regarding a desired object or event; and outputting one or more fine-grained classifications corresponding to the desired object or event utilizing the natural language model infused with the human-augmented knowledge graph.

In another embodiment, a method of retrieving and displaying a segment of a video feed based utilizing a human-assisted neuro-symbolic system is provided. The method includes receiving image data from one or more cameras; extracting visual information from the image data, wherein the visual information includes a coarse-grained classification of one or more objects or events detected in the image data; building a knowledge graph with instantiated domain ontology of the one or more objects or events detected in the image data; augmenting the domain ontology of the knowledge graph with a human-in-the-loop process to yield a human-augmented knowledge graph; infusing a deep learning model with the human-augmented knowledge graph; receiving, from a user, fine-grained input characteristics of a desired object or event; utilizing the deep learning model infused with the human-augmented knowledge graph, retrieving, from storage, a portion of a video feed corresponding to the fine-grained input characteristics; and displaying, to the user, the portion of the video feed via a graphical user interface According to another embodiment, a human-assisted neuro-symbolic system for outputting fine-grained classifications corresponding to an object in an image along with a corresponding video of the object is provided. The system includes one or more cameras configured to generate a video feed, a user interface configured to receive an input from a user, and one or more processors. The one or more processors are programmed to: generate video analytics (VA) data from the video feed; wherein the VA data includes coarse-grained classification data regarding one or more objects in the video feed; extract the coarse-grained classification data from the video feed; build a knowledge graph with instantiated domain ontology of the one or more objects in the video feed; enable, via a first crowd worker interface, one or more crowd workers to augment the domain ontology of the knowledge graph to yield a human-augmented knowledge graph; infuse a deep learning model with the human-augmented knowledge graph; receive, via the user interface, the input from the user, wherein the input includes fine-grained input characteristics of a desired object or event; retrieve, via utilization of the deep learning model infused with the human-augmented knowledge graph, a portion of the video feed corresponding to the fine-grained input characteristics; and display, via the user interface, the portion of the video feed.

BRIEF DESCRIPTION OF THE DRAWINGS

FIG. 3 shows an example of a user interface for providing a rules-based input or natural language input for a certain scene, and an output of the appropriate scene determined via the HANS system, according to an embodiment.

FIG. 5 illustrates a flowchart for the HANS system, according to an embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Intelligent traffic management systems, also referred to as intelligent traffic monitoring (ITMo), may be used to improve safety, traffic flow, and overall system efficiency. These systems are typically implemented to reduce congestion, react to incidents that impact traffic flow, and provide insight into traffic patterns. Cameras are typically used to capture images or video of certain points of interest (e.g., an intersection, a street, etc.). Intelligent video analytics can be used to derive coarse-grained, low-level features based on detected objects in the scene. For example, the video analytics software can recognize objects (e.g., car, truck, pedestrian, or others), along with attributes of the objects (e.g., number, speed, trajectory, etc.). The analytics can also determine basic behavior, such as a car traveling above a certain speed limit, or a collision based on the relative location of two vehicles and/or its change in speed. However, this coarse-grained information is limited.

According to various embodiments disclosed herein, a neuro-symbolic artificial intelligence system is disclosed and can provide more intelligent information associated with the captured images. A knowledge graph is built based on detected objects and their characteristics. Then, by infusing the knowledge graph into a neural network, more fine-grained, high-level contextual information is available for output. For example, vehicular behavior may be determined (e.g., a garbage truck, a light-duty plow truck, a parking violation, a near-miss of a collision), and human behavior can be determined (e.g., a pedestrian jaywalking, a person illegally dumping, or criminal activity such as auto theft or reckless driving).

Figure 1:
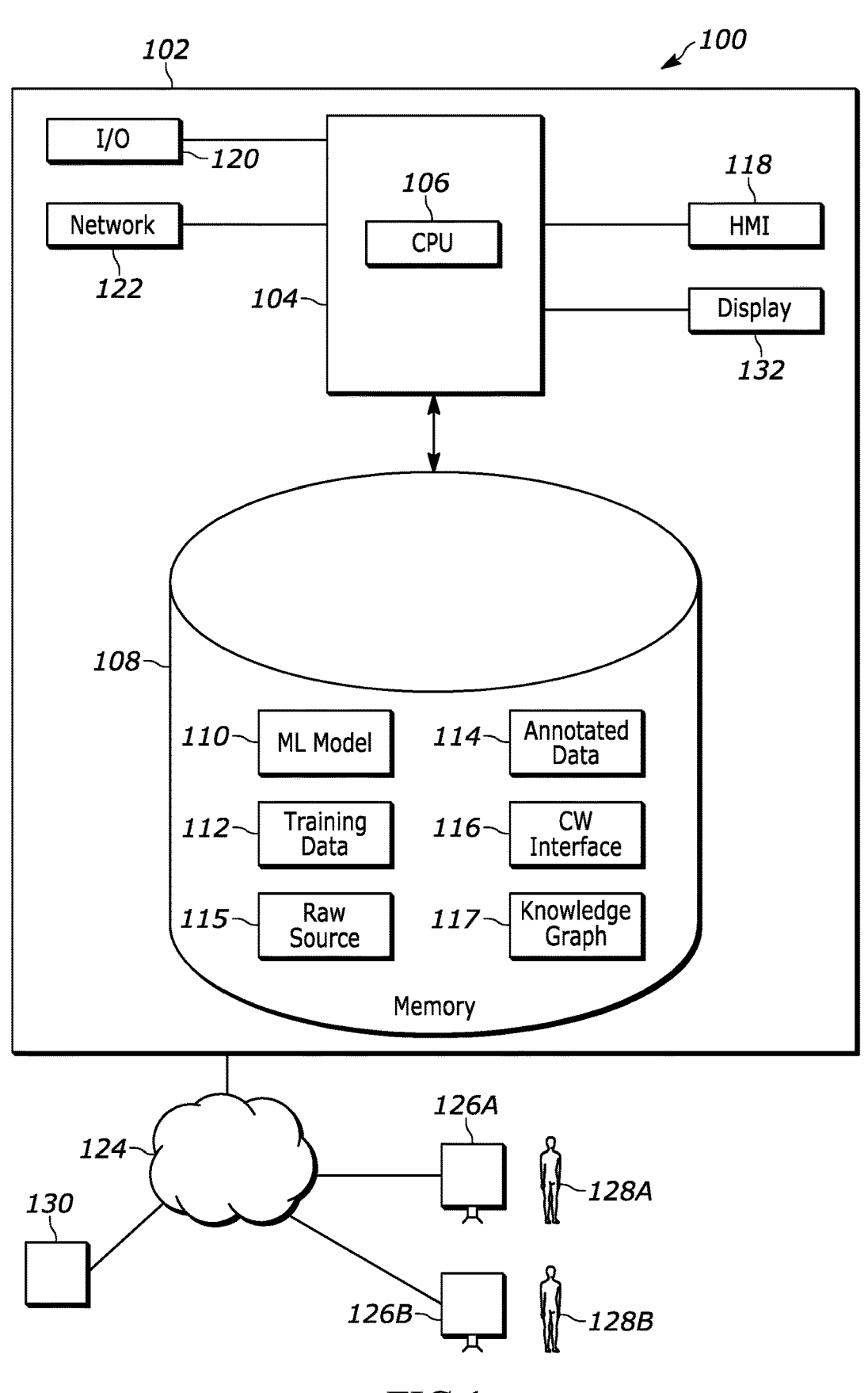
FIG. 1 depicts a possible configuration for a human-assisted neuro-symbolic (HANS) system for acting on multi-modal sensor-based knowledge, according to an embodiment.

FIG. 1 shows a human-assisted (or human-augmented) neuro-symbolic system (HANS) 100, according to one embodiment. The HANS system 100 may include at least one computing system 102. The computing system 102 may include at least one processor 104 that is operatively connected to a memory unit 108. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, an annotated dataset 114 for storing results of the data annotation, raw source dataset 115, and a crowd worker interface 116 process.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 (e.g., each containing their own computer, processor, memory, etc.) may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

Figure 4:
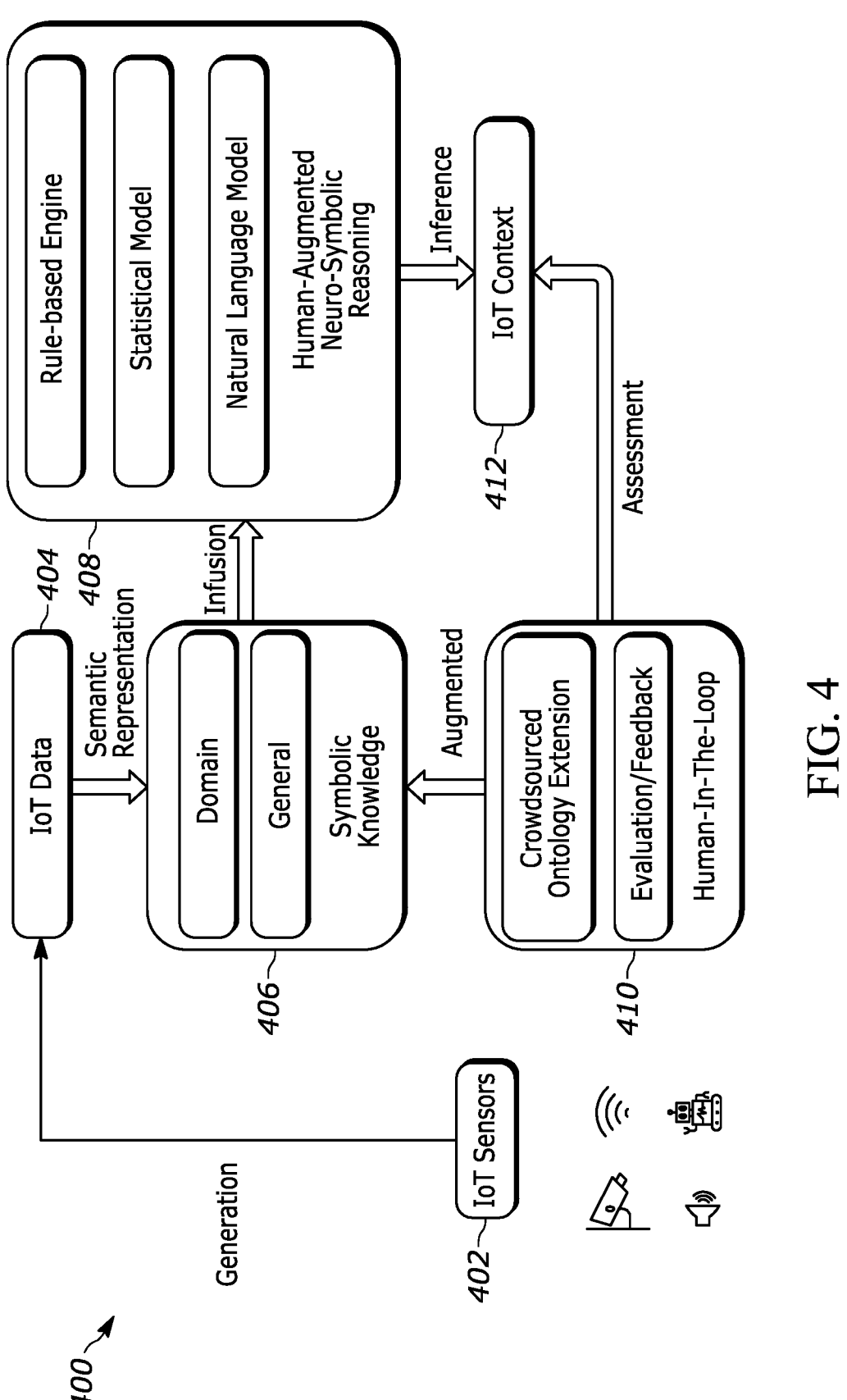
FIG. 4 shows an architecture of the HANS system according to another embodiment.

The computing system 102 may include a human-machine interface (HMI) device 118 that may include any device that enables the HANS system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. An example of what can be shown on the display device 132 is shown in FIG. 4 as described below. The computing system 102 may be further configured to allow interaction with remote HMI and remote display devices via the network interface device 122.

The HANS system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors. As an example, the crowd worker interface 116 process could be implemented on a separate computing system.

Crowd workers 128 may utilize workstations 126 to access the external network 124. The crowd workers 128 may also be referred to as task executors. Crowd workers 128 may not be expected to have any specific domain expertise. The crowd workers 128 may be registered in one or more crowdsourcing markets such as Amazon Mechanical Turk. The crowdsourcing market may be implemented on one of the servers 130. The crowdsourcing market may allow a task requestor to upload tasks for completion by the crowd workers 128. The crowd workers 128 may access the crowdsourcing market using the workstations 126. The workstations 126 may include components similar to the computing system 102. The workstations 126 may be personal computing devices including a user interface for input and output. The workstations 126 may include a display device. For example, the workstations 126 may be computers having a display and keyboard. The workstations 126 may include tablets and cell phones.

The HANS system 100 may implement a machine-learning algorithm 110 that is configured to analyze the raw source dataset 115 to generate the annotated dataset 114. The raw source dataset 115 may include raw or unprocessed sensor data that may be representative of an input dataset for a machine-learning system. The raw source dataset 115 may include video, video segments, images, text-based information, and raw or partially processed sensor data (e.g., radar map of objects). In other examples, the raw source dataset 115 may include radar, LiDAR, ultrasonic and motion sensor data. In some examples, the machine-learning algorithm 110 may be a neural network algorithm that is designed to perform a predetermined function. For example, the neural network algorithm may be configured in automotive applications to identify pedestrians in video images. The machine-learning algorithm 110 may be configured to generate the annotated dataset 114 for use by other machine-learning systems. For example, the annotated dataset 114 may be used as a training data for a pedestrian detection system for an automotive application. The machine-learning algorithm 110 may be configured to generate coarse-grained classification data corresponding to objects in the images, such as "human," "vehicle," "building," and the like. And, as will be described further herein, this (or another) machine-learning algorithm 110 may also determine fine-grained classification data as output by the HANS system.

The annotated dataset 114 may include annotations in addition to the raw source dataset 115. For example, when the raw source dataset 115 is video images, each frame incorporated into the annotated dataset 114 may have corresponding annotations. The annotations may include descriptions that are associated with identified coordinates of the image frame. For example, the annotations may include bounding boxes for particular features. The annotations may include color coding of particular features. The annotations may define text labels or descriptions for features found in the image.

The HANS system 100 may store the training dataset 112 for the machine-learning algorithm 110. Alternatively, the training dataset 112 may be stored in a memory separate from the HANS system, and instead the HANS system 100 utilizes a fully-trained machine-learning system. The training dataset 112 may represent a set of previously annotated data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In an example, the machine-learning algorithm 110 may be designed to identify the presence and location of pedestrians in video images and annotate the data accordingly. And, as will be described further below, the machine-learning systems utilized in conjunction with the HANS system 100 may be designed to identify both coarse-grained classification (e.g., the type of object) and utilize annotation to adjust/confirm this classification, as well as fine-grained classification (e.g., object behavior) and utilize annotation to adjust/confirm this classification. In this example, the training dataset 112 may include source videos with and without objects (e.g., vehicles, pedestrians, etc.) and corresponding presence and location information. The source videos may include various scenarios in which objects are identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations) with those included in the training dataset 112. Since the training dataset 112 includes the expected results, the machine-learning algorithm 110 can determine when performance is acceptable. After the machine-learning algorithm 110 achieves a predetermined performance level (e.g., convergence, near 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may be configured to identify a particular feature in the raw source data 115. The raw source data 115 may include a plurality of instances or input dataset for which annotation results are desired. For example, the machine-learning algorithm 110 may be configured to identify the presence of a pedestrian in video images and annotate the occurrences. The machine-learning algorithm 110 may be programmed to process the raw source data 115 to identify the presence of the particular features. The machine-learning algorithm 110 may be configured to identify a feature in the raw source data 115 as a predetermined feature (e.g., pedestrian). The raw source data 115 may be derived from a variety of sources. For example, the raw source data 115 may be actual input data collected by a machine-learning system that is using the annotated dataset 114. The raw source data 115 may be machine generated for testing the data annotation system. As an example, the raw source data 115 may include raw video images from a camera.

In the example, the machine-learning algorithm 110 may process the raw source data 115 and output an indication of the presence of a pedestrian. The output may also include a relative behavior of the pedestrian within the video images, utilizing the HANS system described herein. Such information may be part of the annotation. The machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

The computing system 102 may further include a crowd worker interface process 116 that is programmed to provide an interface between the machine-learning algorithm 110 and the crowd workers 128 (via the work stations 126). The crowd worker interface 116 may be predefined and/or programmed by the developer of the HANS system 100. The developer may identify a predetermined set of prompts or scripted dialogs to allow a human to confirm, annotate or assist the accuracy of the data in the knowledge graph, for example. The scripted dialogs may include a particular request to the crowd worker 128 to provide input in a particular manner. For example, for annotating video images, the crowd worker interface 116 may request that the crowd worker 128 confirm a behavior of an object in the image. For example, a prompt may ask the crowd worker 128: "Is this vehicle driving normal or erratically?" The input provided by the crowd worker 128 may be in the form of text. In other examples, the crowd worker interface 116 may request the crowd worker 128 to point and click on areas of interest on the displayed image. The crowd worker interface 116 may be configured to identify each type of error that causes inaccuracies in the machine-learning algorithm 110. The crowd worker interface 116 may monitor operation of the machine-learning algorithm 110 to detect conditions in which an inaccuracy may be present. For example, the crowd worker interface 116 may access internal variables of the machine-learning algorithm 110 to determine the accuracy and performance. Additional utilization of the crowd workers is described below with reference to FIG. 2.

A crowd worker 128 may be able to process the raw source data 115 to determine if the particular feature is present. For a visual task, the crowd worker 128 may be able to reliably indicate the presence of the particular feature (e.g., pedestrian) in the raw source data 115. In addition, the crowd worker 128 may be well-suited to identify other features that may be causing the machine-learning algorithm 110 to have trouble with the identification. In addition, when the annotation results generated by the machine-learning algorithm 110 are displayed, the crowd-worker 128 may be able to determine if the result is reasonable.

In other cases, some of the raw source data 115 may be randomly selected for monitoring by a crowd-source task. The crowd-source task may be uploaded to a server 130 that hosts a crowd-sourcing marketplace. The crowd-source task may be assigned to or selected by one of the crowd workers 128 that is registered in the marketplace. The crowd worker 128 may access the task via the external network 124 using the workstation 126. In some configurations, the interactive task may be an executable program that is downloaded and executed on the crowd worker workstation 126. The executable program may include a graphical interface and establish communication with the crowd worker interface 116 via the external network 124. The crowd worker interface 116 may then communicate with the task to exchange data. In other examples, the task may be a link to a webpage associated with the crowd worker interface 116. The task may be accessed by the crowd worker 128 using a web browser executed on the workstation 126. The task establishes a communication link between the crowd worker interface 116 and the crowd worker 128. The crowd worker interface 116 may provide content to be displayed on the crowd worker workstation 126. The crowd worker workstation 126 may be configured to provide crowd worker input data to the crowd worker interface 116.

The HANS system disclosed herein is designed to easily adapt to various sensor-based domains, including indoor scenarios such as smart buildings and home surveillance, and outdoor settings, like smart cities, digital agriculture, etc. While the present disclosure focuses on applying the HANS system to vehicle traffic monitoring, it should be appreciated that the teachings herein can be applied to various non-traffic settings such as those listed above.

Figure 2:
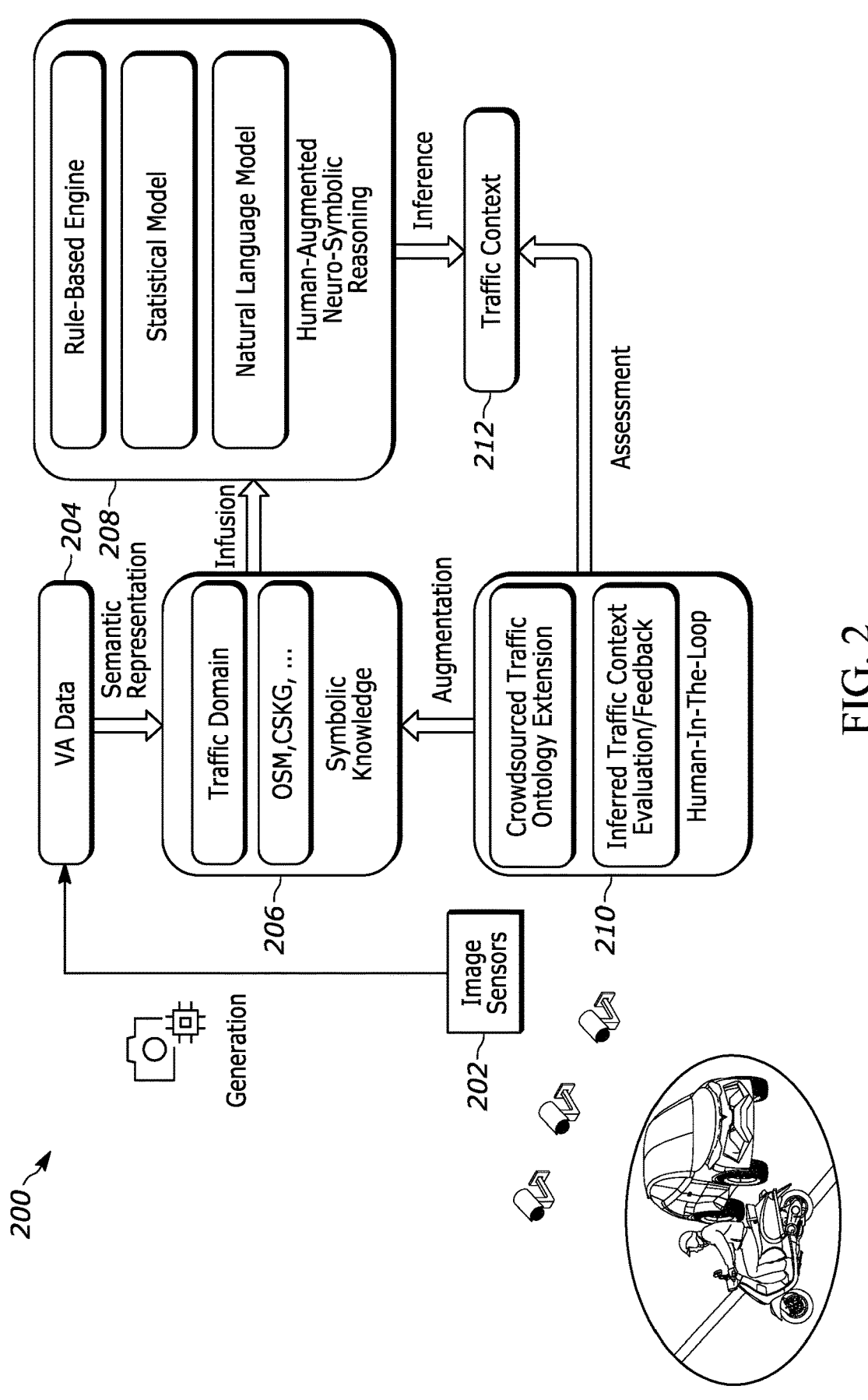
FIG. 2 shows an architecture of the HANS system, according to an embodiment.

FIG. 2 shows an architecture of the HANS system, according to an embodiment generally illustrated at 200. The system 200 includes one or more image sensors 202 configured to provide an input image and corresponding image data. The image sensors 202 can include cameras. In other embodiments, the image sensor can be a light detection and ranging (LiDAR) sensor, a digital camera sensor (e.g., detecting light in and around the visible spectrum), an infrared camera, a short-, medium- or long-range thermal image sensor, a millimeter radar sensor, a sonar sensor (e.g., an ultrasonic sensor), a distance sensor for producing range imaging, a motion sensor, a thermal imaging camera, or any other type of sensor that produces associated data that can produce some sort of indication of a presence of an object.

In one embodiment, computer vision algorithms (e.g., executed using the processor 104 of FIG. 1) are used to extract basic visual information from images or videos collected by the image sensors 202. This information is can be referred to as video analytics (VA), in an embodiment. This VA data 204 can include coarse-grained classification such as object classes (car, truck, pedestrian, bicycle, traffic light, road sign, etc.), as well as speed and trajectory of moving objects, and their relative positions (e.g., based on road topology and lane information). Machine learning systems can be utilized to generate this data as part of the image processing, and the VA data 204 that is part of this generated data can be extracted therefrom.

One or more symbolic knowledge graphs 206 can then be generated based on this extracted VA data 204. For example, an ontology for traffic monitoring (at the domain level) can be built. This can be an extension of Scene Ontology (core level) disclosed in Knowledge Graphs for Explainable Artificial Intelligence Foundations, cited by Applicant, and the disclosure therein of the knowledge graphs are incorporated herein. In short, a knowledge graph include traffic information (e.g., the presence and number and location of vehicles, bicycles, pedestrians, etc. in view of the camera) can be created and built on the time scale. Through suitable mapping mechanisms, the VA data 204 are used to instantiate the domain ontology and generate a traffic monitoring knowledge graph (TMKG). The TMKG can be implemented using enterprise-level knowledge graph frameworks, such as STARDOG for example. This is further expanded with relevant partitions of two different resources: the federated Common-sense Knowledge Graph (CSKG) (cited by Applicant as Consolidating Commonsense Knowledge (Ilievski et al, 2020), which is incorporated by reference here) that provides commonsense background knowledge related to the traffic domain, and Open Street Maps (OSM) that expands traffic scenes on the basis of the location-based knowledge consistent with the GPS coordinates of the cameras.

The knowledge graph generated at 206 can include nodes that represent characteristics of items or events from the detected scene or image dat. For example, one node may include the coarse-grained information of the presence of a "pedestrian." Further connected nodes can yield more fine-grained information such as the pedestrian's movement speed, the location of the pedestrian (e.g., on a sidewalk, crosswalk, road), whether the pedestrian is going into or out of a building or vehicle, physical characteristics of the pedestrian (height, color of skin, color of clothing, wearing a hat), and the like.

The knowledge graph 206 can then be infused into human-augmented neuro-symbolic (HANS) reasoning, shown generally at 208. Neuro-symbolic refers to the fusion of knowledge graphs (symbolic) with a neural network or machine learning system, and human-augmented refers to the human-in-the-loop system discussed below with reference to 210. The knowledge graph 206 is used as a basis for reasoning. According to one embodiment, three different reasonings can be performed by the HANS. First, the knowledge graph 206 can trigger rule-based inferences for simple predictions. For example, a given number of cars on a lane may be considered a threshold to identify a traffic jam. In another example, a particular vehicle changing between lanes a certain number of times within a time threshold can be considered erratic driving. In another example, a particular type of vehicle (e.g. passenger car) in a restricted area where passenger cars are not allowed can identify suspicious activity. In another example, a vehicle driving by a particular location a number of times exceeding a threshold can identify suspicious activity. These are merely examples of rule-based inferences allowable by the HANS reasoning platform based on the knowledge graph 206. Satisfaction of these rules can yield an output on a graphical user interface, such as that shown in FIG. 3.

Second, the knowledge graph 206 can train a statistical model, e.g., similarity-based statistical algorithms with specific triple-based scene features. For example, a type of object with a certain trajectory, in a certain lane and traveling at a certain speed can be modeled from the knowledge graph.

And third, the knowledge graph 206 can provide fine-tuning of a deep learning model such as a natural language model with sentences generated from multi-hop (edge) connections linking different nodes of the knowledge graph. In other words, a natural language model can be infused with at least portions of the knowledge graph 206. For integration with natural language reasoners, the system implements conversion methods to transform the background and scene knowledge into human-readable sentences (natural language). The resulting outputted sentences include basic visual information such as scene composition (e.g., "it has 3 cars and 2 trucks"), or topological information (e.g., "the road has three lanes"), and for the background knowledge it has sentences such as "truck is a car." One can then use the natural sentences as input to any reasoner to interpret text. For example, a RoBERTa language model can be utilized to find image frames that match a natural language query based on the knowledge graph data. Roberta: A Robustly Optimized Bert Pretraining Approach (Liu et al., 2019) is cited by Applicant and the disclosure regarding the RoBERTa language model is hereby incorporated by reference as one potential natural language model that can rely on the knowledge graph data to produce a natural language output with the desired information regarding the image scene. Any other suitable natural language model or vision language model (for which natural language sentences, along with corresponding video excerpts, would be considered the input to reasoners) can be used.

A human-in-the-loop process 210 can also be part of the HANS system 200. Crowd workers 128 may connect to the HANS system 200 via network 124, as explained above with reference to FIG. 1 to perform various tasks for the human-in-the-loop process 210. Here, one or more crowd sourced modules can be utilized, such as a crowdsourced traffic ontology extension (configured to review the results of the ontology determination of the objects detected by the image sensors), an inferred traffic context evaluation or feedback process, or the like. These modules can include two main human-in-the-loop processes: an early phase where relevant concepts to model the traffic domain are elicited using crowdsourcing, and a late phase where crowd workers are asked to assess the results of the HANS reasoning of 208. Both phases can rely on the crowd sourcing platforms discussed with regard to FIG. 1. In one example, in the early phase, crowd workers may determine that the concept of an "illegal turn" is relevant to describe traffic situations frequently encountered within a dataset: upon cross-validation through inter-annotator agreement metrics, the ontology is extended with such a concept. In the later phase, the human-in-the-loop process is triggered to provide human validation to HANS-based predictions. For example, where the HANS system may initially recognize an attempt to break into a car by a person over a given time interval, crowd workers may be able to identify the person as the owner of the car from previous activity and conclude that the owner tried to force the car door open because she left the keys inside, or due to other similarly exceptional circumstances. Such feedback can be feedback into the HANS system to improve subsequent predictions accordingly.

As described herein, the HANS system 200 can be utilized with different types of inference methods. For example, the HANS system can be utilized with rule-based models that aim to find certain contextual outcomes based on the rules, such as an identification of a traffic jam based on the video feed. The output traffic context at 212 would include, for example, an identification of traffic jam that can be used in other subsequent systems to, for example, allow users to search for previous traffic jams to monitor recorded past activity. The HANS system can also infuse knowledge graph (e.g., TKMG) data into a pre-trained natural language model. The output traffic context at 212 would include, for example, a natural language answer including an image or video of the desired scene based on the natural language input, as shown in FIG. 3 and described further below.

In previous rule-based traffic evaluation engines (e.g., ITMo), the system may use the deviation of each frame of video from the median as a core indicator of traffic congestion. For example, a rule may be set such that if a number of cars in the frame exceed a threshold, then a determination of traffic congestion may be made. A more flexible rule-based method provided by the HANS system due to its infusion of knowledge graph data can facilitate the incorporation of additional extracted information from the image. FIG. 3 represents an example of this method, implemented using a HANS graphical user interface (GUI). This functionality can help the user to perform on-the-fly annotations to assess the quality or complexity of rules, and provide various options to implement advanced queries.

Moreover, the knowledge graph structure from 206 infused into the reasoning at 208 can enable a user to find similar frames compared to the input. For example, an input could be a user seeking "3 objects in the scene, 2 cars and 1 bike. The cars are located in lane 3 and move at an average speed of 5 meters per second." The HANS reasoner at 208 may output the following traffic context: "3 objects in the scene. From the objects, 1 is a bike and 2 are cars. The first car is moving with an average speed of 7.74 meters per second, and the second car is moving with an average speed of 5.21 meters per second. The first car and the second car are in lane 3." This output may be accompanied by the associated video scene retrieved from storage.

Graph based reasoning methods are limited to graph structure and may be incapable of easily incorporating background knowledge of traffic domain. This may make it difficult for a user to navigate a knowledge graph manually or with desired rules to seek a desired scene. Therefore, natural language may be incorporated. As described above, tor integration with natural language reasoners, the HANS system can implement conversion methods to transform the background and scene knowledge into human-readable sentences (natural language). The resulting sentence output at 212 could include natural-language information about the scene (e.g., "the scene has 3 cars and 2 trucks"), or topological information (e.g., "the road has three lanes"). Using a fine-tuned natural language model (e.g., RoBERTa), various natural language outputs can be provided based on the natural language inputs. One example of a natural language input may be a user saying or typing "show me a scene with no cars in it." The resulting output may be a natural language output such as "Here is a scene with 2 objects, which are both bikes. The first bike is moving with an average speed of . . . " Another example of a natural language input may be a user saying or typing "show me a scene with a fast moving car." The resulting output may be a natural language output such as "Here is a scene with 1 object in the scene, which is a car. The car is moving with an average speed of 66 meters per second." As described elsewhere herein, the output can be accompanied with the appropriate video segment found from the HANS reasoning. And of course, the definition of subjective terms such as "fast" can be determined by the model itself, such as a vehicle traveling at a speed that deviates from the average vehicle speed at that location by a threshold amount.

FIG. 3 illustrates a graphical user interface (GUI) configured to enable a user to provide a rules-based input or natural language input for a certain desired scene, and an output of the appropriate scene determined via the HANS system, according to an embodiment. The scene output by the system can allow the user to view one or more images or video feed or snip having the desired quality. One rule that the user has selected is that the output video feed be greater than 20 seconds long. Other potential rules the user can select (but has chosen not to for this particular input) may include the number of vehicles in the scene, a vehicle velocity, a special relationship between the vehicles, and the weather. Other rules can be added. Instead of using the rules, the user can simply type a natural language input, in this case the user has asked for a scene in which "There are 3 objects in the scene, 3 cars. The second car is moving at average speed of 8 m/s." As shown in the Search Results below, the HANS system has output a certain video feed with an associated description of "There are 3 object(s) in the scene. From the object(s), all 3 are cars, the second car is moving with an average speed of 8.21 m/s, the third car is moving with an average speed of 2.99 m/s. In lane 3 we see second car and third car." This output is possible because of the HANS system's ability to leverage knowledge graph data, looking for connected nodes in the knowledge graph in which three cars are in the scene with one of them traveling at a speed of around 8 m/s. This may be helpful in a situation where, for example, law enforcement is looking for a particular vehicle that it knows was traveling at or around 8 m/s with other vehicles in the vicinity.

It should be understood that the HANS system disclosed herein is not intended to be limited to vehicle or traffic applications. Other applications and systems can benefit from the HANS system's infusion of knowledge graph data into machine learning to produce a neuro-symbolic reasoner. For example, an internet of things (IoT) system can utilize a HANS approach. IoT refers to the interconnection via the internet of computing devices used in everyday objects such as home appliances, security systems, autonomous farming equipment, wearable health monitors, shipping container and logistics tracking, and the like. FIG. 4 illustrates an embodiment of a HANS system 400 applied to an IoT setting. Reference numbers are used in FIG. 4 that correspond to reference numbers of similar features of FIG. 2 except in increments of 200 higher. One or more IoT sensors 402 (e.g., camera, microphone, other sensors listed above) can generate the IoT data 404 used for one or more knowledge graphs 406, similar to generation in system 200. The knowledge graphs 406 can includes nodes that include information about the domain of the input, as well as the general characteristics of the object or input. Similar to FIG. 2, human-in-the-loop processes 410 can be used to augment the knowledge graph outputs, which are infused into the HANS reasoning at 408 to produce the desired output, e.g., IoT Context.

FIG. 5 illustrates a flowchart for implementing the HANS system 200, 400, according to an embodiment. The method can be performed using any one or more of the disclosed processors programmed to execute instructions stored in memory to perform the various steps. At 502, the one or more processors receives image data. Again, this can be generated based on the image data received from image sensors 202, or IoT sensors 402, for example. The image data can be from other sensors, such as those listed above, e.g., lidar, radar, sonar, sound, and the like that can generate data that represents a detected item or object.

The image data may have corresponding classification information. For example, if the image data is used in an object-detection system, the image data may have corresponding classification regarding objects detected in the image. Potential coarse-grained classification data may include information regarding an item being a pedestrian, a vehicle, a building, a road sign, or the like. At 504, the one or more processors extracts visual information with such coarse-grained classifications. Coarse-grained classification represents categories with a large degree of dissimilarity, such as the classification of a vehicle and a pedestrian, for example.

At 506, the one or more processors builds or supplements an existing knowledge graph with instantiated (e.g., over time) domain ontology. The knowledge graph may be built with nodes and edges, with each node representing a piece of data extracted from the image data at 504. For example, a single image may yield a plethora of nodes connected by edges, such as the presence of a pedestrian, a vehicle, etc. built on the time scale (e.g., time stamped). The knowledge graph can be stored in memory, as shown at 117 in FIG. 1.

The images can then be sent to a crowdsourcing platform, for example via network 124 and workstations 126. The crowd workers can provide a human-in-the-loop process to verify the information that makes up the various nodes of the knowledge graph. Relevant coarse-grained concepts can be submitted to the crowd workers to confirm the model's output, such as the presence of a pedestrian, the presence of the vehicle, and the like. If necessary, the crowd workers can augment the data to improve the accuracy of the knowledge graph. Such augmentation is received by the one or more processors at 508 to improve the knowledge graph, yielding a human-augmented knowledge graph.

At 510, the one or more processors infuses a pre-trained natural language model with the human-augmented knowledge graph to yield a human-augmented neuro-symbolic (HANS) reasoner, as described herein and illustrated at 208 and 408. The combination of knowledge graph data and a neural network allow for rule-based inferences for predictions, training of statistical models, and/or providing tuning of deep learning models such as natural language models, as described herein.

In the case of implementing the HANS reasoning with a natural language mode, the one or more processor receives a natural language input at 512. The input may be seeking an object or event of interest. For example, the input may be "show me a scene with a garbage truck in the left lane from February $22^{nd}$ of last year." At 514, the one or more processors relies on the natural language model infused with the human-augmented knowledge graph to derive and output fine-grained classifications corresponding to the desired object or event. Continuing with the same example, the output may include a video segment of a garbage truck in the left lane, along with a natural language output corresponding to the same. The output may include fine-grained nodes from the knowledge graph so that not only is a vehicle detected (coarse-grained), but the vehicle is determined to be a garbage truck (fine-grained), and is determined to be located in the left lane (fine-grained). These fine-grained data points can be determined via their node in the knowledge graph. While coarse-grained classification represents categories with a large degree of dissimilarity (e.g., vehicle, pedestrian, etc.), fine-grained classifications represents classifications with a larger degree of similarity, such as vehicle types (e.g., car, truck, garbage truck, van, SUV, etc.), the location of those objects (left lane, right lane, etc.), pedestrian characteristics (e.g., walking, running, biking, using mobile device, etc.).

The HANS system can be used in various scenarios, as described herein. In one example, the HANS system can be used to output fine-grained classification of certain objects themselves. There are currently no viable methods for determining fine-grained classification of certain objects, such as types of vehicles (e.g., "garbage truck" versus other types of trucks). Using the HANS system, the contextual information surrounding the detected vehicle can be taken into consideration in determining that the determined vehicle is in fact a garbage truck. Such contextual information can include, for example, the vehicle stopping and starting at intervals, a person near the vehicle at all times, the person getting on and off the vehicle at the intervals, and so on. Each one of these contextual information can be stored as a node in the knowledge graph, which can then be infused into the machine learning or rule-based engine at 208 to output an assessment that the detected vehicle is a garbage truck. That way, when a user wishes to see a video or image of a garbage truck, the HANS system can retrieve images of the detected garbage truck using the information in the knowledge graph. This information may be helpful when, for example, certain vehicles (e.g., non-garbage trucks) are not allowed in an area, so that way a user or the system can determine if any suspicious activity occurred, such as a passenger vehicle being in an area where it is forbidden to be.

In another example, the HANS system can be used to retrieve certain images or video that would corresponding to a fine-grained classification such as "suspicious" or "criminal activity." For example, law enforcement may know that a fire started at a house on a particular night, e.g., last Tuesday. An input request may include "show me suspicious activity last Tuesday." The system disclosed herein can then use the data in the knowledge graph to show features or characteristics of a detected person that may deviate from the norm or violate some rules. For example, the system may look to the knowledge graph for connected nodes over time with characteristics such as (1) a detected individual in the scene, (2) at a certain time of night (e.g., between midnight and 4:00 am), (3) going into a building, and (4) immediately coming out of the building. Such connected nodes may lead to the HANS reasoned 208 to indicate the presence of suspicious activity (e.g., arson), reducing the need for humans to manually review through video feeds.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of outputting fine-grained classifications corresponding to an object utilizing a human-assisted neurosymbolic system, the method comprising:
   receiving, by a processor, image data from one or more image sensors, wherein the one or more image sensors include at least one of a camera, LiDAR, or radar sensor;
   processing, by the processor, the image data to extract visual information from the image data, wherein the visual information includes a coarse-grained classification of one or more objects or events detected in the image data;
   building, by the processor, a knowledge graph with instantiated domain ontology of the one or more objects or events, wherein the knowledge graph includes a plurality of nodes, each node corresponding to a respective domain ontology of the one or more objects;
   augmenting the domain ontology of the knowledge graph with a human-in-the-loop process to yield a human-augmented knowledge graph;
   infusing, by the processor, a natural language model with the human-augmented knowledge graph, wherein the infusing comprises: (i) transforming information from the human-augmented knowledge graph into natural-language sentences, and (ii) fine-tuning the natural language model with the natural-language sentences;
   receiving a natural language input regarding a desired object or event; and
   outputting, by the processor, one or more fine-grained classifications corresponding to the desired object or event utilizing the natural language model infused with the human-augmented knowledge graph.

2. The method of claim 1, wherein the domain ontology includes the coarse-grained classification of the one or more objects.

3. The method of claim 1, further comprising assessing the one or more fine-grained classifications with a second human-in-the-loop process.

4. The method of claim 1, wherein the coarse-grained classification includes an identification of the one or more objects being a vehicle or a pedestrian.

5. The method of claim 4, wherein the fine-grained classification includes an identification of a type of the vehicle.

6. The method of claim 4, wherein the fine-grained classification includes an identification of the pedestrian jaywalking or performing criminal activity.

7. The method of claim 4, wherein the fine-grained classification includes an indication of the vehicle being in a location in which the type of vehicle is not allowed.

8. The method of claim 1, wherein the one or more image sensors are security cameras, and the one or more fine-grained classification includes an indication of suspicious or criminal activity based upon movement characteristics of the one or more objects detected by the cameras.

9. The method of claim 1, wherein the transforming of information from the human-augmented knowledge graph into natural-language sentences comprises generating sentences based on multi-hop connections linking different nodes of the knowledge graph.

10. The method of claim 1, wherein the one or more image sensor includes at least two of the camera, LiDAR, or radar sensor, such that the one or more image sensor generates multi-sensor data;

wherein the knowledge graph includes a plurality of nodes, each node instantiated with spatial and temporal attributes derived from the multi-sensor data.

* * * * *